(12) United States Patent
Tsai et al.

(10) Patent No.: US 9,579,805 B2
(45) Date of Patent: Feb. 28, 2017

(54) BRAKE DEVICE OF ROBOT ARM

(71) Applicant: QUANTA STORAGE INC., Taoyuan (TW)

(72) Inventors: Yao-Ching Tsai, Taoyuan (TW); Jen-Chen Wu, Taoyuan (TW)

(73) Assignee: QUANTA STORAGE INC., Taoyuan (TW)

( * ) Notice: Subject to any disclaimer, the term of this patent is extended or adjusted under 35 U.S.C. 154(b) by 0 days.

(21) Appl. No.: 14/925,992

(22) Filed: Oct. 29, 2015

(65) Prior Publication Data

US 2016/0121492 A1    May 5, 2016

(30) Foreign Application Priority Data

Nov. 5, 2014 (CN) .......................... 2014 1 0621049

(51) Int. Cl.
*B25J 19/00* (2006.01)

(52) U.S. Cl.
CPC ................................. *B25J 19/0004* (2013.01)

(58) Field of Classification Search
CPC .............................. B25J 19/0004; B25J 18/00
USPC ... 188/156, 171; 74/490.01, 490.03, 490.05; 310/77, 83, 93; 901/19, 23; 318/362, 318/568.11
See application file for complete search history.

(56) References Cited

U.S. PATENT DOCUMENTS

| | | | |
|---|---|---|---|
| 4,129,797 A * | 12/1978 | Lindner | H02K 7/125 188/218 XL |
| 4,181,201 A * | 1/1980 | McCarthy | F16D 55/28 188/171 |
| 4,398,110 A * | 8/1983 | Flinchbaugh | B25J 9/1025 310/83 |
| 4,552,504 A * | 11/1985 | Nakada | B25J 9/06 414/735 |
| 4,577,127 A * | 3/1986 | Ferree | B25J 9/1025 310/112 |
| 4,678,952 A * | 7/1987 | Peterson | B25J 9/1025 310/83 |
| 4,798,269 A * | 1/1989 | Lindner | F16D 55/28 188/171 |
| 5,155,423 A * | 10/1992 | Karlen | B25J 9/04 318/568.1 |
| 5,186,287 A * | 2/1993 | Lindner | F16D 55/36 188/171 |
| 5,429,339 A * | 7/1995 | Sugiyama | B66D 5/14 188/170 |
| 5,437,351 A * | 8/1995 | Lindner | F16D 55/28 188/171 |
| 7,230,402 B2 * | 6/2007 | Kumagai | B25J 17/00 318/568.11 |
| 8,779,715 B2 * | 7/2014 | Kassow | B25J 19/0004 318/568.1 |

\* cited by examiner

*Primary Examiner* — Thomas J Williams
*Assistant Examiner* — Mariano Sy
(74) *Attorney, Agent, or Firm* — Winston Hsu; Scott Margo

(57) ABSTRACT

A brake device of a robot arm utilizes a brake disc whose diameter is much larger than a diameter of a ratchet for increasing a contacting area of the brake disc, so as to generate a greater friction force. The brake device further utilizes a combining pin, a combining plate, and a plurality of guiding pins for transferring a rotating torque to the brake device having a larger diameter, so as to extend a moment arm of the friction force and generate a greater moment, which reduces a prepressing force and extends life of the brake device.

9 Claims, 5 Drawing Sheets

BRAKE DEVICE OF ROBOT ARM

BACKGROUND OF THE INVENTION

1. Field of the Invention

The present invention relates to a robot arm, and more particularly, to a brake device for stopping a motor of a robot arm from rotating as the robot arm is ceased.

2. Description of the Prior Art

A robot arm capable of taking a work piece and moving back and forth is usually applied to an automated factory for increasing a manufacturing efficiency. The robot arm needs not only a driving module for providing power, but also a reliable brake device to position the robot arm at a predetermined location precisely.

Please refer to FIG. 1. FIG. 1 is a diagram illustrating a conventional driving module 10 of a robot arm in the prior art. The driving module 10 utilizes a motor 11 for driving a shaft 12 to rotate and a reducer 13 for reducing a rotary speed of the shaft 12 to output the power to move the robot arm. A brake device is disposed in the conventional driving module 10. A friction ring 14 is fixed on the shaft 12 and covered by a ratchet 15. The ratchet 15 is fixed on the shaft 12 by a friction force formed between the ratchet 15 and the friction ring 14. A solenoid valve 16 is further disposed for clutching the ratchet 15, so as to stop the ratchet 15 from rotating, such that the motor 11 is braked, which stops the robot arm from moving.

When it is desired to move the robot arm, the solenoid valve 16 is controlled to release the ratchet 15, such that the ratchet 15 rotates along with the shaft 12 driven by the motor 11. When it is desired to stop the robot arm, the conventional driving module 10 is braked, i.e., the solenoid valve 16 is controlled to clutch the ratchet 15 for stopping the ratchet 15 from rotating. Afterwards, the shaft 12 is stopped by a brake moment generated by the friction force formed between the ratchet 15 and the friction ring 14, which prevents the robot arm from moving. However, a rotating torque of the shaft 12 will overcome a maximum static friction force formed between the ratchet 15 and the friction ring 14 due to excessive inertia of the moving robot arm, such that the friction ring 14 still slides relative to the ratchet 15 and rotates along with the shaft 12. Since the shaft 12 is not stopped from rotating forcedly, the robot arm is prevented from being damaged.

However, the ratchet 15 and the friction ring 14 of the conventional driving module 10 are fixed on the shaft 12 directly, such that the brake moment generated by the ratchet 15 and the friction ring 14 is quite small because the ratchet 15 and the friction ring 14 are too close to the shaft 12. When it is required to increase the brake moment for stop a larger or faster robot arm, it is usually to increase the friction force formed between the ratchet 15 and the friction ring 14 due to a constant distance between the solenoid valve 16 and the ratchet 15, and limited mechanical space. In other words, a prepressing force of the ratchet 15 acted on the friction ring 14 is increased for increasing the friction force and the brake moment. Therefore, it is required to replace materials and parts to endure higher stresses, which raises manufacturing cost and difficulty of assembly.

Therefore, there is a need to design a brake device of a robot arm for solving the above-mentioned problems.

SUMMARY OF THE INVENTION

The present invention aims at providing a brake device of a robot arm to solve the above-mentioned drawbacks.

According to the claimed invention, a brake device of a robot arm is disposed in a housing of a driving module of the robot arm. The driving module includes a motor, a shaft, a solenoid valve, an operating rod. The motor drives the shaft to rotate. The solenoid valve controls the operating rod to retract or extend. The brake device sheathes on an end of the shaft near the motor, and the brake device includes a prepressing plate, a ratchet, a brake resilient plate, a brake disc, a plurality of guiding pins, a plurality of recovering springs, a combining plate, a combining pin, and a control plate. The prepressing plate is formed in a ring shape and fixed on the housing. The ratchet is disposed on a side of the prepressing plate and fixed on the shaft for rotating along with the shaft. The brake resilient plate is fixed on the other side of the prepressing plate. The brake disc covers the brake resilient plate and is slidable relative to the brake resilient plate. A friction force is formed between the brake disc and the brake resilient plate. The plurality of guiding pins is fixed on the brake disc and passing through a plurality of holes formed on the prepressing plate and toward the ratchet. Each of the plurality of recovering springs sheathes on each of the plurality of guiding pins. The combining plate slidably sheathes on the plurality of guiding pins. The plurality of recovering springs abuts between the brake disc and the combining plate. The combining pin is fixed on the combining plate and moves along with the combining plate. The combining pin selectively enters into or leaves from a rotating path of the ratchet. The control plate is for controlling a movement of the combining plate. The control plate includes a supporting shaft fixed on the prepressing plate. Two supporting arms respectively extend from two ends of the supporting shaft and toward two sides of the shaft. The two supporting arms are located above the combining plate, and one of the two supporting arms is located in a retracting path of the operating rod.

According to the claimed invention, when the combining pin combines with the ratchet, a rotating torque of the shaft is transferred to the brake disc via the ratchet, the combining pin, and the plurality of guiding pins, so as to extend a moment arm of the friction force for braking the shaft. A diameter of the brake disc is larger than a diameter of the ratchet, so as to increase the friction force generated by the brake disc.

According to the claimed invention, when the solenoid valve controls the operating rod to retract, the two supporting arms release the combining plate, such that the plurality of recovering springs pushes the combining plate to enter into the rotating path of the ratchet and combine with the ratchet, so as to stop the shaft from rotating. When a rotating torque of the shaft is greater than a moment of a maximum static friction force of the friction force generated by the brake disc, the brake disc slides relative to the brake resilient plate. When the solenoid valve controls the operating rod to extend and push against the one of the two supporting arms, the two supporting arms push the combining plate to overcome a recovering force generated by the plurality of recovering springs, such that the combining pin leaves from the rotating path of the ratchet to release the shaft.

In summary, since the diameter of the brake disc is much larger than the diameter of the ratchet, a contacting area of the brake disc is increased to generate a greater friction force. Furthermore, the rotating torque of shaft is transferred to the brake disc having a larger diameter via the combining pin, the combining plate, and the plurality of guiding pins for extending the moment arm of the friction force, so as to increase the braking moment of the friction force. Additionally, a prepressing force of the prepressing plate can be reduced because the brake disc has a larger diameter, which prevents the parts from being worn out and extends service life of the parts. Besides, the present invention further can stop the shaft from rotating precisely.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
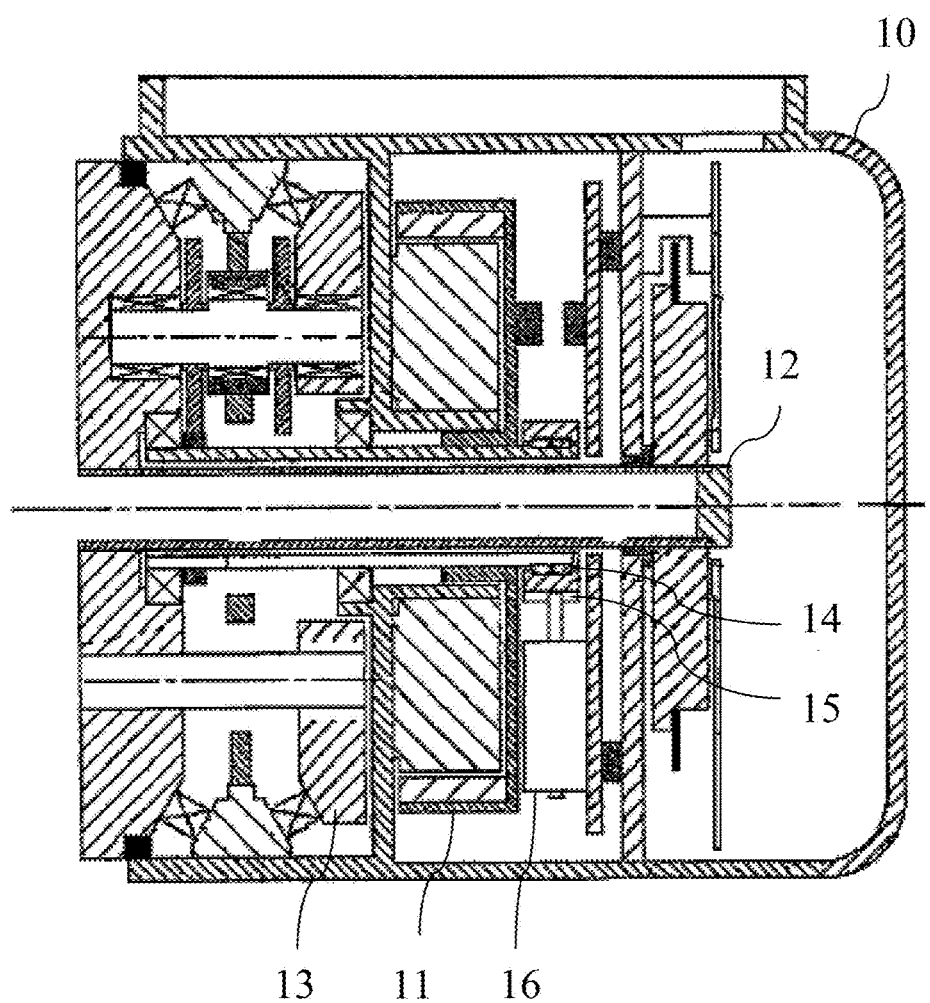
FIG. 1 is a diagram illustrating a conventional driving module of a robot arm in the prior art.
Figure 2:
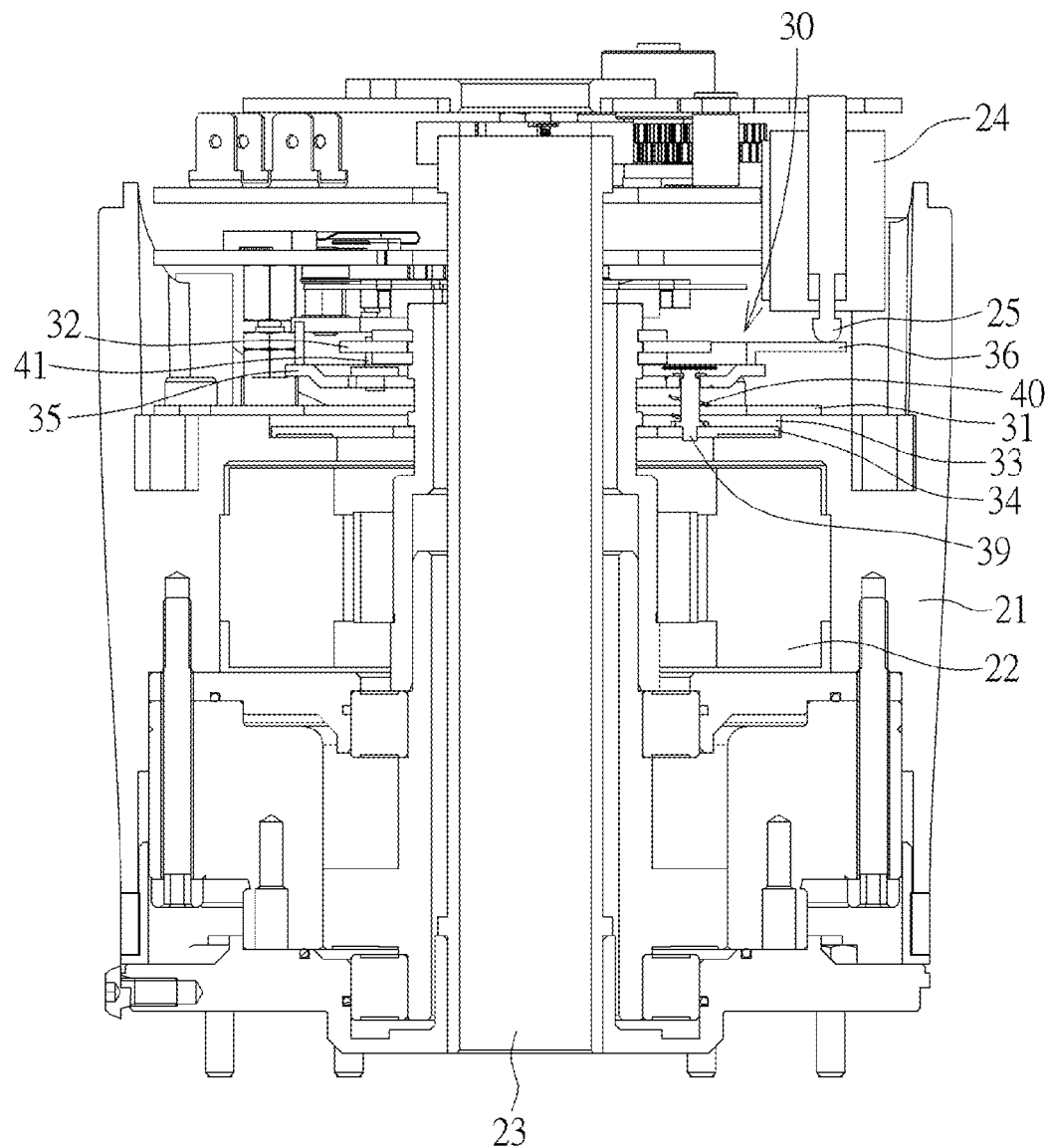
FIG. 2 is a lateral view of a driving module of a robot arm at a braking position according to an embodiment of the present invention.
Figure 3:
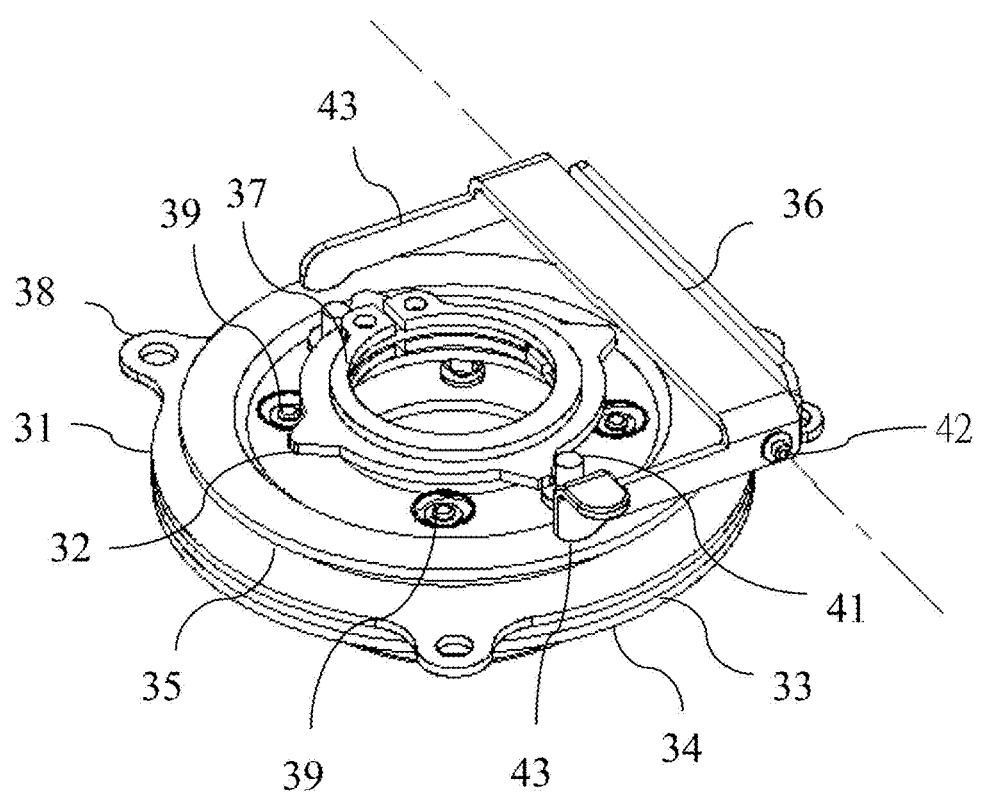
FIG. 3 is a perspective diagram of a brake device at the braking position according to the embodiment of the present invention.

Please refer to FIG. 2 and FIG. 3. FIG. 2 is a lateral view of a driving module 20 of a robot arm at a braking position according to an embodiment of the present invention. FIG. 3 is a perspective diagram of a brake device 30 at the braking position according to the embodiment of the present invention. As shown in FIG. 2 and FIG. 3, the robot arm includes the driving module 20 and the brake device 30. The driving module 20 of the robot arm includes a housing 21, a motor 22, a shaft 23, a solenoid valve 24, and an operating rod 25. The motor 22 sheathes on the shaft 23 disposed at a center of the housing 21 and drives the shaft 23 to rotate for moving the robot arm. The solenoid valve 24 is fixed on the housing 21 for controlling the operating rod 25 to activate or release the brake device 30. The brake device 30 of the present invention is disposed inside the housing 21 of the driving module 20

The brake device 30 includes a prepressing plate 31, a ratchet 32, a brake resilient plate 33, a brake disc 34, a combining plate 35, and a control plate 36. A center hole 37 is formed on the brake device 30, such that the brake device 30 sheathes on an end of shaft 23 near the motor 22. The brake device 30 is fixed inside the housing 21 by a flange 38 protruding from a periphery of the ring-shaped prepressing plate 31. The ratchet 32 is located at a side of the prepressing plate 31 and fixed on the shaft 23 for rotating along with the shaft 23. The brake resilient plate 33 is fixed on the other side of the prepressing plate 31 and covered by the brake disc 34 having a larger diameter than a diameter of the ratchet 32 for increasing a friction force formed between the brake resilient plate 33 and the brake disc 34. The brake resilient plate 33 is clamped between the prepressing plate 31 and the brake disc 34. The brake disc 34 is slidable relative to the brake resilient plate 33 and prepressing plate 31. By adjusting a distance between the prepressing plate 31 and the brake disc 34, the brake resilient plate 33 is compressed to adjust a maximum static friction force of the friction force formed between the brake disc 34 and the brake resilient plate 33.

The brake device 30 further includes a plurality of guiding pins 39 and a plurality of recovering springs 40. The plurality of guiding pins 39 passes through a plurality of holes formed on the prepressing plate 31 and toward the ratchet 32. The plurality of the recovering springs 40 sheathes on the plurality of guiding pins 39 respectively. The combining plate 35 sheathes on the plurality of guiding pins 39, such that the plurality of recovering springs 40 is clamped between the brake disc 34 and the combining plate 35. The combining plate 35 is slidable relative to the plurality of guiding pins 39 and pushed by the plurality of the recovering springs 40, so as to be guided to move between the brake disc 34 and the ratchet 32 by the plurality of guiding pins 39. A combining pin 41 is fixed on the combining plate 35 and located on a rotating path of the ratchet 32. The combining pin 41 moves along with the combining plate 35 for selectively entering into the rotating path of the ratchet 32 to combine with the ratchet 32 or leaving from the rotating path of the ratchet 32 to release the ratchet 32.

The combining plate 35 is driven to move by the control plate 36. The control plate 36 is a U-shaped member. A closed end of the control plate 36 is a supporting shaft 42 fixed on the prepressing plate 31. Two supporting arms 43 extend from two ends of the supporting shaft 42 and toward two sides of the shaft 23. The two supporting arms 43 are located above the combining plate 35. One of the two supporting arms 43 is located in a retracting path of the operating rod 25 driven by the solenoid valve 24, such that the two supporting arms 43 are driven to rotate around the supporting shaft 42 by the operating rod 25. The two supporting arms 43 push the combining plate 35 evenly to overcome a recovering force generated by the plurality of recovering springs 40, such that the combining pin 41 leaves from the rotating path of the ratchet 32. Alternatively, the two supporting arms 43 release the combining plate 35 for allowing the plurality of recovering springs 40 to push the combining plate 35, such that the combining pin 41 enters into the rotating path of the ratchet 32.

As shown in FIG. 2 and FIG. 3, when the driving module 20 of the robot arm is braked, the driving module 20 controls the solenoid valve 24 to retract the operating rod 25 for releasing the control plate 36. Since the control plate 36 does not push the combining plate anymore, the plurality of recovering springs 40 pushes the combining plate 35 to move toward the ratchet 32 along the plurality of guiding pins 39. The combining pin 41 enters into the rotating path of the ratchet 32 and combines with the ratchet 32. At the same time, a rotating torque of the shaft 23 is transferred to the combining pin 41 via the ratchet 32 and then to the brake disc 34, whose diameter is larger than the diameter of the ratchet 32, via the guiding pins 39, so as to extend a moment arm of the friction force. Furthermore, since the diameter of the brake disc 34 is much than the diameter of the ratchet 32, a contacting area of the brake disc 34 is increased to generate a greater friction force, so as to provide a greater braking moment of the friction force to stop the brake disc 34 from rotating and to eliminate the rotating torque of the shaft 23, which stops the shaft 23 from rotating.

When the rotating torque of the shaft 23 is greater than the moment of the maximum static friction force of the friction force formed between the brake resilient plate 33 and the brake disc 34, the brake disc 34 is driven to disengage from the brake resilient plate 33 by the shaft 23, such that the brake disc 34 slides over a frictional surface of the brake resilient plate 33 and rotates relative to the brake resilient plate 33. A dynamic friction force of the friction force formed between the brake disc 34 and the brake resilient plate 33 eliminates the rotating torque of the shaft 23 quickly and continuously for stopping the shaft 23 from rotating 23, which not only prevents the robot arm from being damaged due to excessive rotating torque of the shaft 23 but also stops the robot arm in a minimum displacement for preventing the robot arm from crashing an operator or another equipment nearby.

Figure 4:
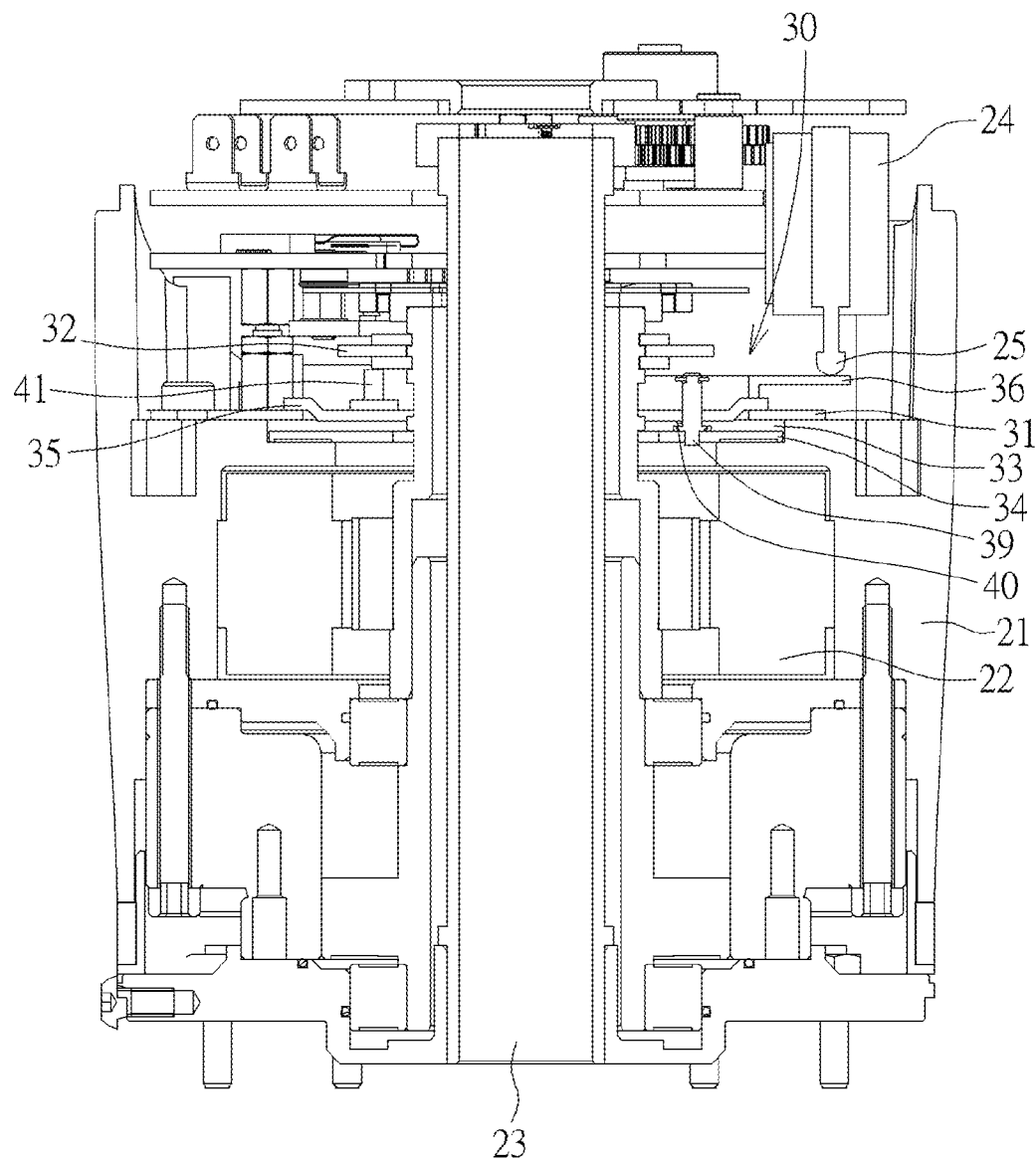
FIG. 4 is a lateral diagram of the driving module of the robot arm at a non-braking position according to the embodiment of the present invention.
Figure 5:
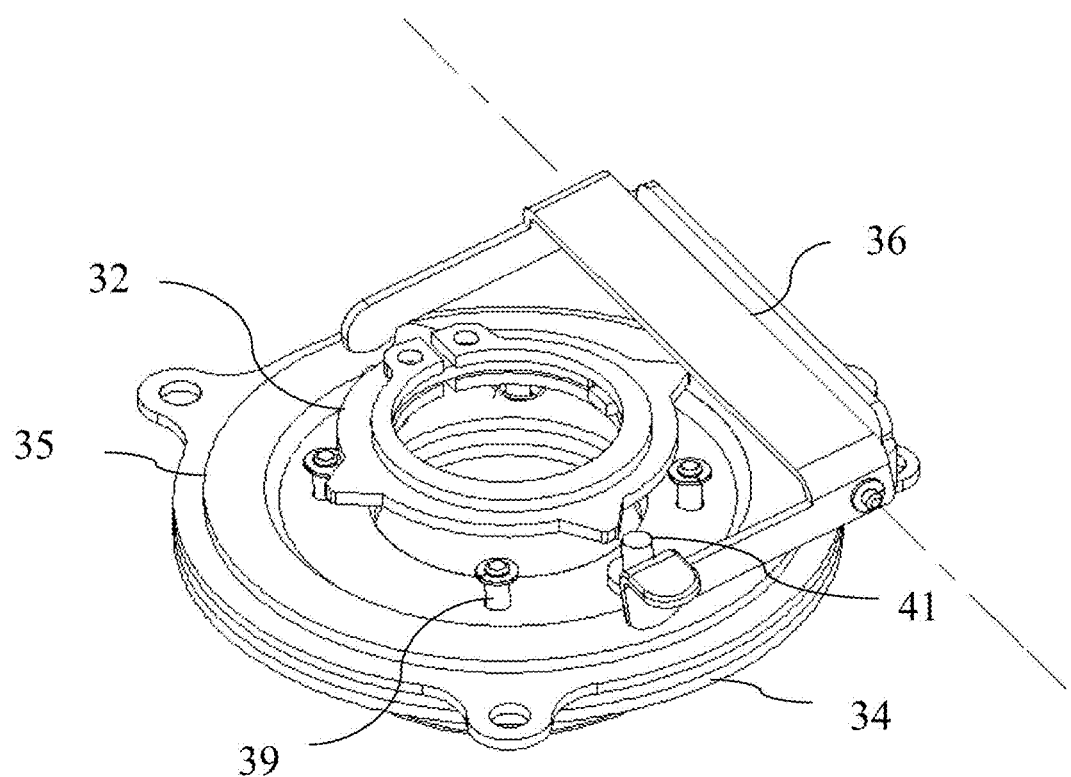
FIG. 5 is a perspective diagram of the brake device at the non-braking position according to the embodiment of the present invention.

Please refer to FIG. 4 and FIG. 5. FIG. 4 is a lateral diagram of the driving module 20 of the robot arm at a non-braking position according to the embodiment of the present invention. FIG. 5 is a perspective diagram of the brake device 30 at the non-braking position according to the embodiment of the present invention. When it is required to rotate the driving module 20 of the robot arm normally, the driving module 20 controls the solenoid valve 24 to extend the operating rod 25 to push the control plate 36. The control plate 36 pushes the combining plate 35 to overcome the recovering force generated by the plurality of recovering springs 40. The combining plate 35 compresses the plurality of recovering springs 40 and is guided to move toward the brake disc 34 by the plurality of guiding pins 39, such that the combining pin 41 leaves from the rotating path of the ratchet 32 and disengages from the ratchet 32. Since the ratchet 32 is not stopped anymore, the shaft 23 can rotate freely for moving the robot arm.

In contrast to the prior art, since the diameter of the brake disc is much larger than the diameter of the ratchet, a contacting area of the brake disc is increased to generate a greater friction force. Furthermore, the rotating torque of shaft is transferred to the brake disc having a larger diameter via the combining pin, the combining plate and the plurality of guiding pins for extending the moment arm of the friction force, so as to increase the braking moment of the friction force. Additionally, a prepressing force of the prepressing plate can be reduced because the brake disc has a larger diameter, which prevents the parts from being worn out and extends service life of the parts. Besides, the present invention further can stop the shaft from rotating precisely.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A brake device of a robot arm, disposed in a housing of a driving module of the robot arm, the driving module comprising a motor, a shaft, a solenoid valve, an operating rod, the motor sheathing on the shaft of the driving module, the motor driving the shaft of the driving module to rotate, the operatin rod being retractably installed on the solenoid valve the solenoid valve controlling the operating rod to retract or extend, the brake device sheathing on an end of the shaft of the driving module near the motor, and the brake device comprising:

a prepressing plate formed in a ring shape and fixed on the housing;
a ratchet disposed on a side of the prepressing plate and fixed on the shaft of the driving module for rotating along with the shaft of the driving module;
a brake resilient plate fixed on the other side of the prepressing plate;
a brake disc covering the brake resilient plate and slidable relative to the brake resilient plate, a friction force being formed between the brake disc and the brake resilient plate;
a plurality of guiding pins fixed on the brake disc and passing through a plurality of holes formed on the prepressing plate and toward the ratchet;
a plurality of recovering springs, each of the plurality of recovering springs sheathing on each of the plurality of guiding pins;
a combining plate slidably sheathing on the plurality of guiding pins, the plurality of recovering springs abutting between the brake disc and the combining plate;
a combining pin fixed on the combining plate and moving along with the combining plate, the combining pin selectively entering into or leaving from a rotating path of the ratchet; and
a control plate for controlling a movement of the combining plate, the control plate comprising a supporting shaft fixed on the prepressing plate, two supporting arms respectively extending from two ends of the supporting shaft and toward two sides of the shaft of the driving module, the two supporting arms being located above the combining plate, and one of the two supporting arms being located in a retracting path of the operating rod;
wherein when the solenoid valve controls the operating rod to retract, the two supporting arms release the combining plate, such that the plurality of recovering springs pushes the combining plate to enter into the rotating path of the ratchet and combine with the ratchet, so as to stop the shaft of the driving module from rotating.

2. The brake device of claim 1, wherein a flange protrudes from a periphery of the prepressing plate for fixing the prepressing plate on the housing.

3. The brake device of claim 1, wherein a maximum static friction force of the friction force formed between the brake disc and the brake resilient plate is adjusted by adjusting a distance between the prepressing plate and the brake disc.

4. The brake device of claim 1, wherein the combining plate is pushed by the plurality of recovering springs and guided to move toward the ratchet by the plurality of guiding pins.

5. The brake device of claim 1, wherein when the solenoid valve controls the operating rod to extend and push against the one of the two supporting arms, the two supporting arms push the combining plate to overcome a recovering force generated by the plurality of recovering springs, such that the combining pin leaves from the rotating path of the ratchet to release the shaft of the driving module.

6. The brake device of claim 1, wherein the control plate is formed in a U-shape, a closed end of the U-shape is the supporting shaft, and the two supporting arms rotates around the supporting shaft.

7. The brake device of claim 1, wherein when the combining pin combines with the ratchet, a rotating torque of the shaft of the driving module is transferred to the brake disc via the ratchet, the combining pin, and the plurality of guiding pins, so as to extend a moment arm of the friction force for braking the shaft of the driving module.

8. The brake device of claim 7, wherein a diameter of the brake disc is larger than a diameter of the ratchet, so as to increase the friction force generated by the brake disc.

9. The brake device of claim 1, wherein when a rotating torque of the shaft of the driving module is greater than a moment of a maximum static friction force of the friction force generated by the brake disc, the brake disc slides relative to the brake resilient plate.

* * * * *